United States Patent
Noh et al.

(10) Patent No.: US 8,676,252 B2
(45) Date of Patent: Mar. 18, 2014

(54) DUAL MODE MOBILE TERMINAL IN MIMO WIRELESS COMMUNICATION SYSTEM AND CONTROLLING METHOD THEREOF

(75) Inventors: Seungpyo Noh, Seoul (KR); Sangjo Park, Seoul (KR); Jaehyuk Jang, Seoul (KR); Yongsang Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 13/196,817

(22) Filed: Aug. 2, 2011

(65) Prior Publication Data

US 2012/0329514 A1 Dec. 27, 2012

(30) Foreign Application Priority Data

Jun. 23, 2011 (KR) .................. 10-2011-0060978

(51) Int. Cl.
*H04W 88/06* (2009.01)

(52) U.S. Cl.
USPC ........ 455/552.1; 455/443; 455/522; 455/436; 455/450; 455/114.2; 370/228; 370/229; 370/321; 370/241; 370/242

(58) Field of Classification Search
USPC ............ 455/552.1, 443, 452.2, 453; 370/336, 370/228–329
See application file for complete search history.

(56) References Cited

U.S. PATENT DOCUMENTS

| | | | | |
|---|---|---|---|---|
| 6,061,568 A | * | 5/2000 | Dent | 455/450 |
| 8,184,580 B2 | * | 5/2012 | Wilhelmsson et al. | 370/329 |
| 8,285,291 B2 | * | 10/2012 | Dinan et al. | 455/443 |
| 2012/0063302 A1 | * | 3/2012 | Damnjanovic et al. | 370/228 |

* cited by examiner

*Primary Examiner* — Kiet Doan
*Assistant Examiner* — Michael T Vu
(74) *Attorney, Agent, or Firm* — Lee, Hong, Degerman, Kang & Waimey (57) ABSTRACT

A method for dual mode mobile terminal in an MIMO wireless communication system is disclosed. The present invention includes the steps of if an uplink transmission mode is for simultaneous transmission to an LTE base station and a CDMA base station, determining whether a transmission power to the LTE base station is equal to or greater than a threshold value, transmitting a simultaneous transmission mode dedicated scheduling request signal for excluding a risky frequency band from an uplink band to the LTE base station, receiving a scheduling information on the uplink band except the risky frequency band from the LTE base station, transmitting a CS service signal to the CDMA base station, and transmitting a PS service signal to the LTE base station using the scheduling information.

10 Claims, 13 Drawing Sheets

(a) Control-plane protocol stack (b) User-plane protocol stack

DUAL MODE MOBILE TERMINAL IN MIMO WIRELESS COMMUNICATION SYSTEM AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2011-0060978, filed on Jun. 23, 2011, the contents of which are hereby incorporated by reference herein in its entirety.

BACKGROUND OF THE INVENTION

1. Field of the Invention

The present invention relates to a dual mode mobile terminal, and more particularly, to a dual mode mobile terminal in an MIMO wireless communication system and controlling method thereof.

2. Discussion of the Related Art

Recently, the wireless communication fields consistently keep being evolved in aspect of fast data transmission and reception as well as voice call. And, ongoing attentions are paid to the $4^{th}$ generation mobile communication technology, e.g., LTE (long term evolution) wireless communication system. Yet, in a current situation that the $4^{th}$ generation communication network and the commercialized $3^{rd}$ generation communication network coexist, a mobile communication terminal or a mobile communication data card should include the 3G mobile communication technology, which is already commercialized and being used globally, as well as the $4^{th}$ generation mobile communication technology. Therefore, in order to support both of the next generation mobile communication technology and the previous generation mobile communication technology, a mobile terminal (hereinafter called a dual mode terminal) equipped with a dual modem processor or a data card type device (hereinafter called a dual mode terminal) equipped with a dual modem processor is required.

The dual mode terminal is equipped with two kinds of modems differing from each other in communication scheme and supports the wireless communications using the two kinds of the modems, respectively. And, the dual mode terminal is frequently used in an area in which heterogeneous communication networks coexist. For example of a representative dual mode terminal, attention is paid to a device capable of both LTE (long term evolution) wireless communication and CDMA (code divisional multiple access) wireless communication. Although the description of the present invention is made on the assumption of a multi-mode device capable of communicating with both LTE network and CDMA network, it is apparent to those skilled in the art that the present invention is applicable to wireless communications of other systems.

Meanwhile, MIMO scheme of transmitting and receiving signals using a plurality of transmitting antennas and a plurality of receiving antennas is applied to the wireless communication of the LTE system. According to the MIMO scheme, a transmitting or receiving stage of a wireless communication system uses a plurality of antennas. Therefore, capacity is increased and performance can be enhanced. Moreover, the wireless communication of the CDMA system needs multiple antennas for a diversity scheme from RV-DO REV. A. In the following description, MIMO can be named 'multi-antenna'.

In the MIMO technology, a reception of one whole message does not depend on a single antenna path. Instead, the MIMO technology completes data in a manner of gathering and integrating data fragments received via multiple antennas. If the MIMO technology is used, a data transmission speed can be enhanced within a cell area of a specific size or a system coverage can be increased by securing a specific data transmission speed. And, this technology is widely applicable to a mobile communication terminal, a relay node and the like. According to the MIMO technology, it is able to overcome the limitation put of a transmission size in a mobile communication according to the related art which adopts a single antenna.

SUMMARY OF THE INVENTION

Accordingly, the present invention is directed to a dual mode mobile terminal in an MIMO wireless communication system and controlling method thereof that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a dual mode terminal according to the present invention includes a first communication module configures to transceive a PS (packet switching) service signal with a first base station, a second communication module configures to transceive a CS (circuit switching) service signal with a second base station, a first antenna configured to transceive a signal with either the first base station or the second base station, and a second antenna configured to receive signals from the first base station and the second base station, wherein if an uplink transmission mode is a mode for simultaneous transmission to the first base station and the second base station, the first communication module determines whether a transmission power to the first base station is equal to or greater than a threshold value, wherein if the transmission power to the first base station is equal to or greater than the threshold value, the first communication module transmits a simultaneous transmission mode dedicated scheduling request signal for excluding a risky frequency band from an uplink band to the first base station, and wherein the first communication module receives a scheduling information on the uplink band except the risky frequency band from the first base station in response to the simultaneous transmission mode dedicated scheduling request signal.

Preferably, an inter-modulation product between the uplink signal to the first base station through the risky frequency band and the uplink signal to the second base station is generated on at least one of a downlink band from the first base station and a downlink band from the second base station.

Preferably, the risky frequency band includes a frequency band situated within a preset value from the uplink band to the second base station in the uplink band to the first base station.

Preferably, the uplink band to the first base station ranges from 777 MHz to 787 MHz and the uplink band to the second base station ranges from 824 MHz to 849 MHz.

In another aspect of the present invention, a dual mode terminal includes a first communication module configures to transceive a PS (packet switching) service signal with a first base station, a second communication module configures to transceive a CS (circuit switching) service signal with a second base station, a first antenna configured to transceive a signal with either the first base station or the second base station, and a second antenna configured to receive signals from the first base station and the second base station, wherein if an uplink transmission mode is a mode for simultaneous transmission to the first base station and the second base station, the first communication module transmits a channel quality information of a preset value on a specific frequency band to the first base station and receives a scheduling information on an uplink band except the specific frequency band from the first base station.

Preferably, the specific frequency band includes a frequency band situated within a preset value from the uplink band to the second base station in the uplink band to the first base station.

More preferably, the channel quality information includes at least one of a PMI (precoding matrix index), a CQI (channel quality indicator) and an RI (rank indicator) and the preset value is determined as a value for not performing an uplink scheduling on the specific frequency band in the first base station.

Preferably, the first base station includes an LTE (long term evolution) base station and the second base station includes a CDMA (code divisional multiple access) base station.

In another aspect of the present invention, a method of controlling a dual mode terminal in an MIMO wireless communication system includes the steps of if an uplink transmission mode is a mode for simultaneous transmission to an LTE (long term revolution) base station and a CDMA (code divisional multiple access) base station, determining whether a transmission power to the LTE base station is equal to or greater than a threshold value, if the transmission power to the LTE base station is equal to or greater than the threshold value, transmitting a simultaneous transmission mode dedicated scheduling request signal for excluding a risky frequency band from an uplink band to the LTE base station, receiving a scheduling information on the uplink band except the risky frequency band from the LTE base station in response to the simultaneous transmission mode dedicated scheduling request signal, transmitting a CS (circuit switching) service signal to the CDMA base station, and transmitting a PS (packet switching) service signal to the LTE base station using the scheduling information.

Preferably, the risky frequency band includes a frequency band situated within a preset value from the uplink band to the CDMA base station in the uplink band to the LTE base station.

In a further aspect of the present invention, a method of controlling a dual mode terminal in an MIMO wireless communication system includes the steps of if an uplink transmission mode is a mode for simultaneous transmission to an LTE (long term revolution) base station and a CDMA (code divisional multiple access) base station, transmitting a channel quality information of a preset value on a specific frequency band to the LTE base station, receiving a scheduling information on an uplink band except the specific frequency band from the LTE base station, transmitting a CS (circuit switching) service signal to the CDMA base station, and transmitting a PS (packet switching) service signal to the LTE base station using the scheduling information.

Preferably, the channel quality information includes at least one selected from the group consisting of a PMI (precoding matrix index), a CQI (channel quality indicator) and an RI (rank indicator) and the preset value is determined as a value for not performing an uplink scheduling on the specific frequency band in the LTE base station.

According to an embodiment of the present invention, a dual mode terminal transmits data to an LTE network, thereby preventing voice and data transceiving with a CDMA network from being disconnected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the concept of the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like. And, assume that a base station is a common name of such a random node of a network stage communicating with a terminal as a node B, eNode B, a base station and the like.

First of all, in the following description, 3GPP LTE ($3^{rd}$ generation partnership projecting long term evolution) communication system is schematically explained as an example of a wireless communication system to which the present invention is applicable.

Figure 1:
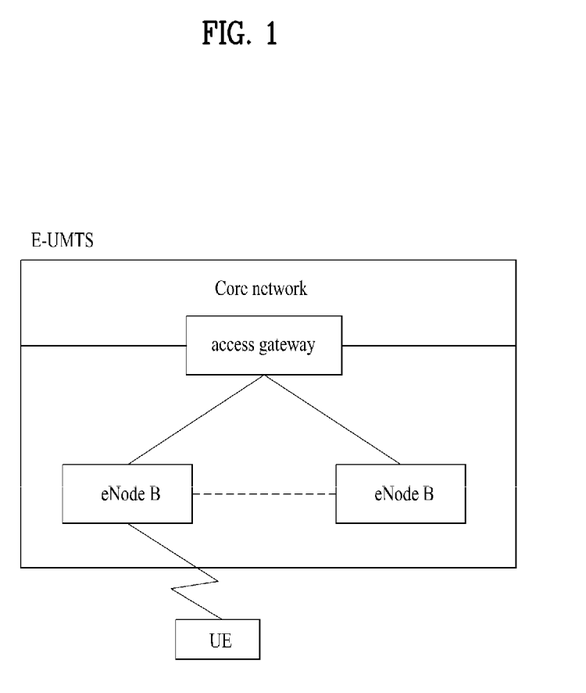
FIG. 1 is a schematic diagram of E-UMTS network structure as an example of a mobile communication system.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

Figure 2:
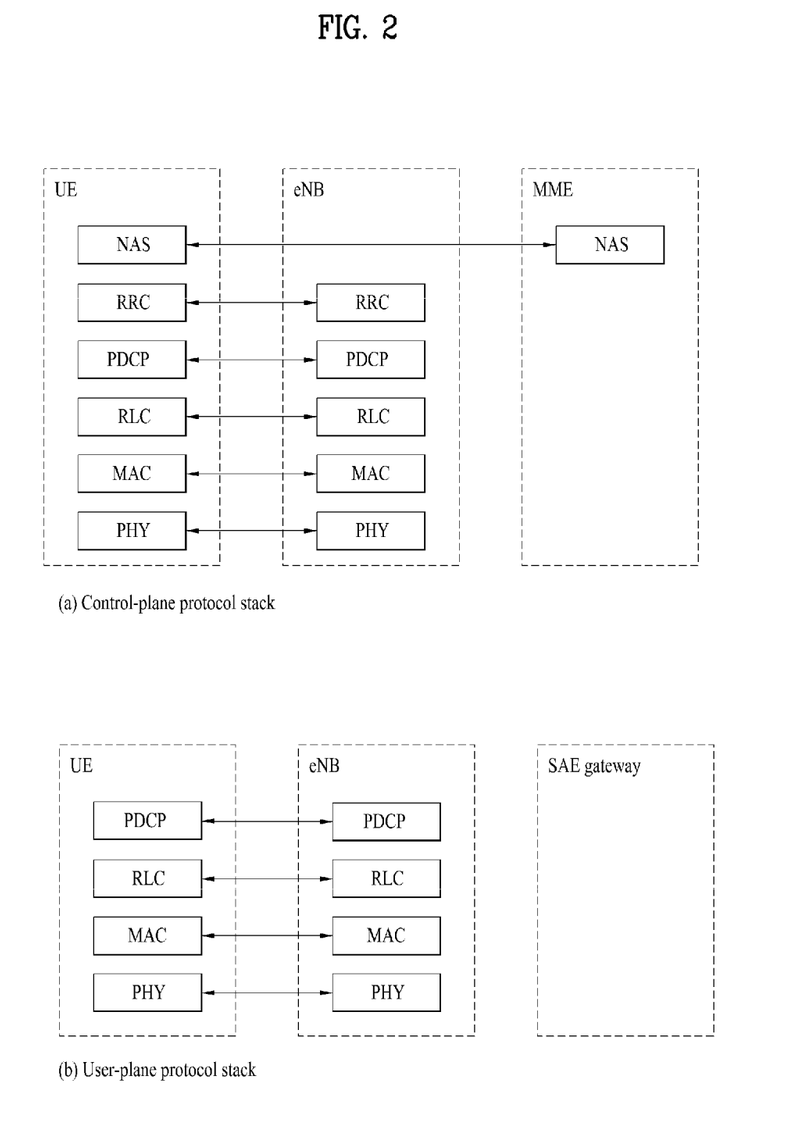
FIG. 2 is a diagram of structures of control and user planes of a radio interface protocol between a user equipment and E-UTRAN based on 3GPP radio access network specification.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
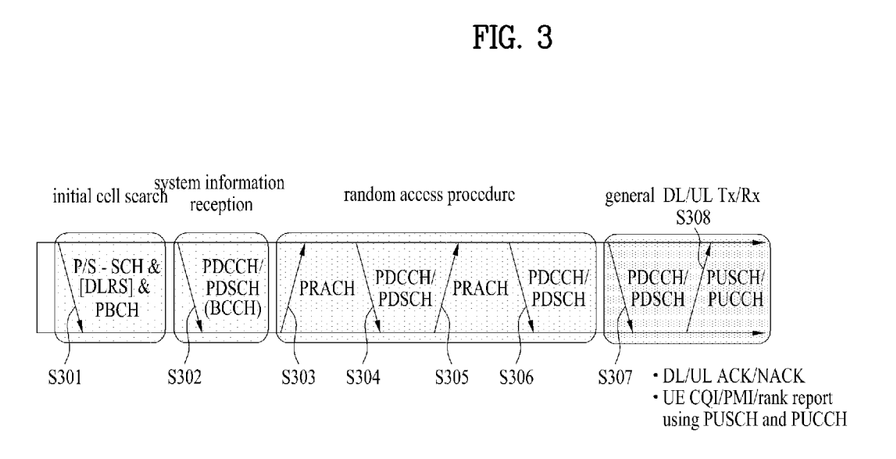
FIG. 3 is a diagram for explaining physical channels used for 3GPP system and a general method of transmitting a signal using the same.

FIG. 3 is a diagram for explaining physical channels used for 3GPP system and a general method of transmitting a signal using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303] and is then able to receive a response message via PDCCH and a corresponding PDSCH in response to the preamble [S304]. In case of contention based RACH, it is able to perform a contention resolution procedure in addition.

Having performed the above-mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
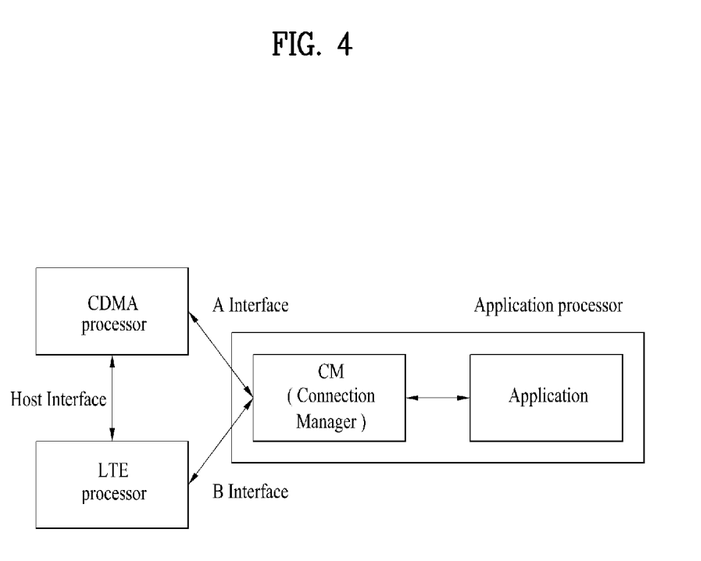
FIG. 4 is a block diagram for a configuration of a dual mode terminal.

FIG. 4 is a block diagram for a configuration of a dual mode terminal.

Referring to FIG. 4, a dual mode terminal is able to include an application processor, an LTE processor for processing a signal received from an LTE network, and a CDMA processor for processing a signal received from a CDMA network.

The application processor can include a single module by hardware within the dual mode terminal or can be configured within a PC independently from the dual mode terminal. And, the application processor can include a connection manager (CM) for managing and controlling an access state to the CDMA network or the LTE network in accordance with a network environment.

In particular, the CM plays a switching role in transmitting and receiving data between the application and one of the two processors (e.g., the CDMA processor and the LTE processor) in accordance with a network access state. Namely, in case that the dual mode terminal is connected to the CDMA network, the application data is transceived via A-interface to connect the CDMA processor and the application to each other. Alternatively, in case that the dual mode terminal is connected to the LTE network, the application data is transceived via B-interface to connect the LTE processor and the application to each other.

A host interface is situated between the CDMA processor and the LTE processor and can be used for transmissions of control and data signals between the two processors.

Meanwhile, SVLTE (simultaneous 1xRTT voice and LTE data) is the function provided by the LTE network and is characterized in providing a voice cal and a data service simultaneously. In particular, while a phone is being used, the SVLTE enables an internet use by multitasking.

In case of a terminal, which supports a conventional CDMA network access only, since SVLTE is not supported, it is impossible to perform a data service in the course of a voice call (i.e., a phone and an internet are not available simultaneously.). If a paging signal for a voice call is received while a user is using an internet via a terminal supporting a CDMA network access only, the corresponding internet is disconnected, the voice call is terminated in accordance with terminal implementation, and an internet connection is then tried again. Moreover, even if an internet access is tried using a multitasking function in the course of a voice call, it may cause a problem that an internet becomes inaccessible without a specific announcement message.

Yet, in case of the dual mode terminal shown in FIG. 4, when a user is located in an SVLTE supported area, it is able to maintain a corresponding internet access while a voice call is in progress. Therefore, even if a voice call is tried by receiving a paging signal in the course of using an application for providing a data service, it is able to maintain an internet access. On the contrary, when a user is located in an SVLTE-unsupportable area, i.e., an area for granting a CDMA network access only, since a voice call and an internet access are not simultaneously performed, the voice call and the internet access may or may not be granted to the user occasionally, which causes confusion to the user. Therefore, a method for providing the user with this information is necessary.

Figure 5:
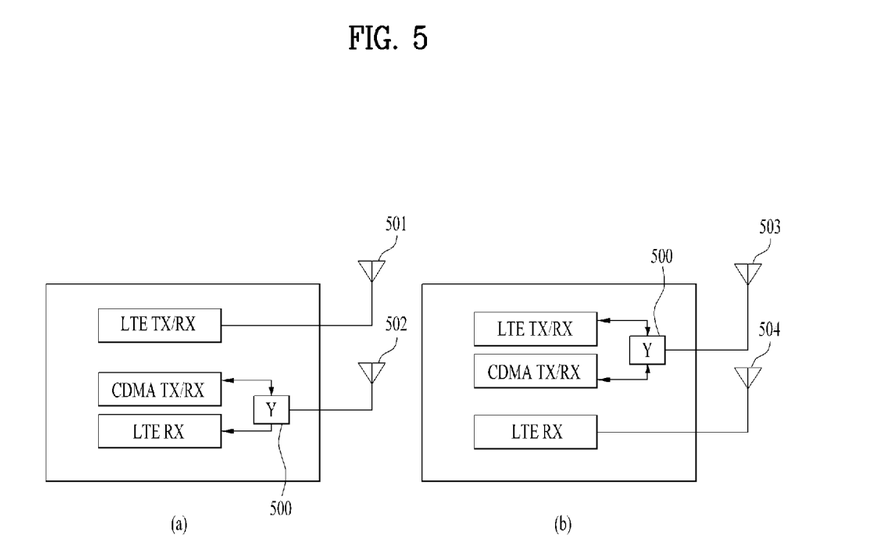
FIG. 5 is a diagram for a general configuration of a dual mode terminal for providing SVLTE function.

FIG. 5 is a diagram for a general configuration of a dual mode terminal for providing SVLTE function.

Referring to FIG. 5, an independent transceiving unit for each system exists (i.e., two transceiving units). If a communication with an individual system base station is performed via the corresponding transceiving unit, voice and data can be simultaneously supported. FIG. 5 (*a*) and FIG. 5 (*b*) show structures in accordance with how to separate and transmit a transmitted/received signal of each system in case of using two antennas. In particular, FIG. 5 (*a*) and FIG. 5 (*b*) show that a filter 500 for separating two signals is included.

FIG. 5 (*a*) shows a structure that an LTE transmitting unit and a CDMA transmitting unit are separated into different antenna ports 501 and 502, respectively. FIG. 5 (*b*) shows a structure that an LTE transmitting unit and a CDMA transmitting unit are used in a manner of sharing a same antenna port 503 with each other.

Figure 6:
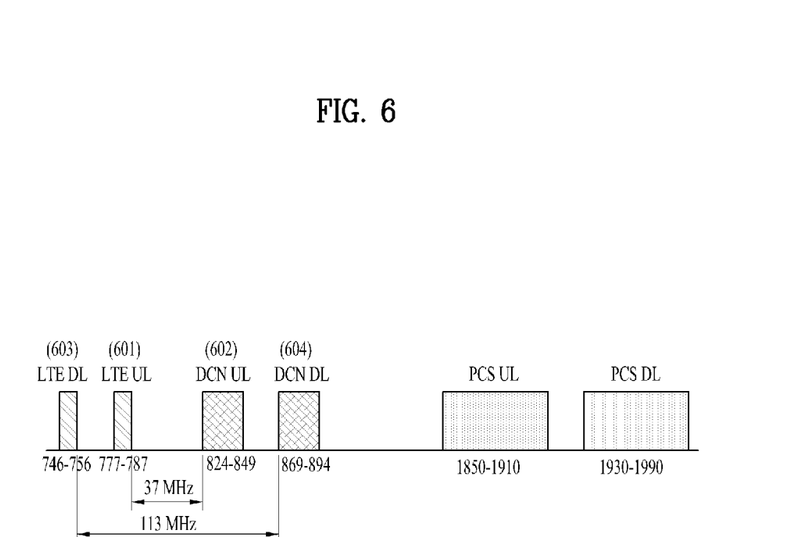
FIG. 6 is a diagram of frequency bandwidths serviced by Verizon Communications, U.S.A.

FIG. 6 is a diagram of frequency bandwidths serviced by Verizon Communications, U.S.A.

Referring to FIG. 6, since an interval between a CDMA DCN (data core network) UL (uplink) band 602 and an LTE UL band 601, which are provided by Verizon Communications, U.S.A., is very narrow, it is very difficult for the current technology to implement a high-precision combiner/separator capable of dividing the CDMA DCN UL band 602 and the LTE UL band 601 from each other. Even if it is possible to implement the high-precision combiner/separator, it causes a problem of lack of realization in cost.

Figure 7:
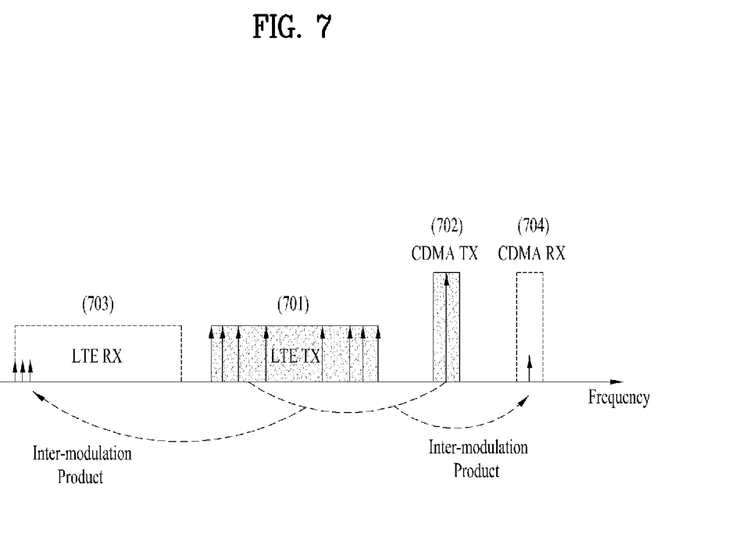
FIG. 7 is a diagram for describing the problems caused in the terminal configuration shown in FIG. 5 and the frequency bandwidths shown in FIG. 6.

FIG. 7 is a diagram for describing the problems caused in the terminal configuration shown in FIG. 5 and the frequency bandwidths shown in FIG. 6.

Referring to FIG. 7, when signals are simultaneously transmitted from two different transmitting units, a generated inter-modulation product affects a reception band. In particular, if signals are transmitted on two different bands in order to simultaneously support LTE system and CDMA system, since an interval between a CDMA DCN (data core network) UL (uplink) band 702 and an LTE UL band 701 is very narrow, an inter-modulation product between the two signals may invade reception bands 703 and 704. Therefore, reception performance can be seriously degraded.

Specifically, in case that two transmitting units share an antenna to use, as shown in FIG. 5 (b), a filter for filtering off a specific band should be added to each transceiving unit to minimize a corresponding inter-modulation product. Yet, as the filter addition causes an insertion loss, basic reception performance is degraded and limitation is put on filtering off noise introduced via another antenna.

Moreover, in case that two transmitting units use different antennas, respectively, as shown in FIG. 5 (a), a filter needs to be added. If so, limitation is put on filtering off an inter-modulation product introduced via antenna. Therefore, in a situation that two transmitting units are simultaneously operating in the conventional configuration, as a noise component due to the inter-modulation product is not filtered off but invades a reception band, call disconnection or data transmission failure frequently takes place.

As mentioned in the foregoing description, if CDMA signal and LTE signal are simultaneously transmitted in SV-LTE system, a noise attributed to an inter-modulation product between the two signals is introduced into a reception band to cause fatal degradation of performance. Even though various circuit schemes exist to minimize the noise influence, a signal should avoid being transmitted on a frequency, which may cause interference between two signals, in order to prevent the noise generation basically. Since bandwidth and frequency are stationary in CDMA, it is impossible to use other frequencies but a frequency requested by a base station within the same area. Yet, LTE system is able to perform relatively free transmission within the same area in accordance with frequency and bandwidth allocated by a base station. Therefore, based on this characteristic, unless LTE signal is transmitted on a frequency, which causes noise due to an inter-modulation product, even if both CDMA and LTE systems simultaneously operate, it is able to provide a stable service without corresponding performance degradation.

Figure 8:
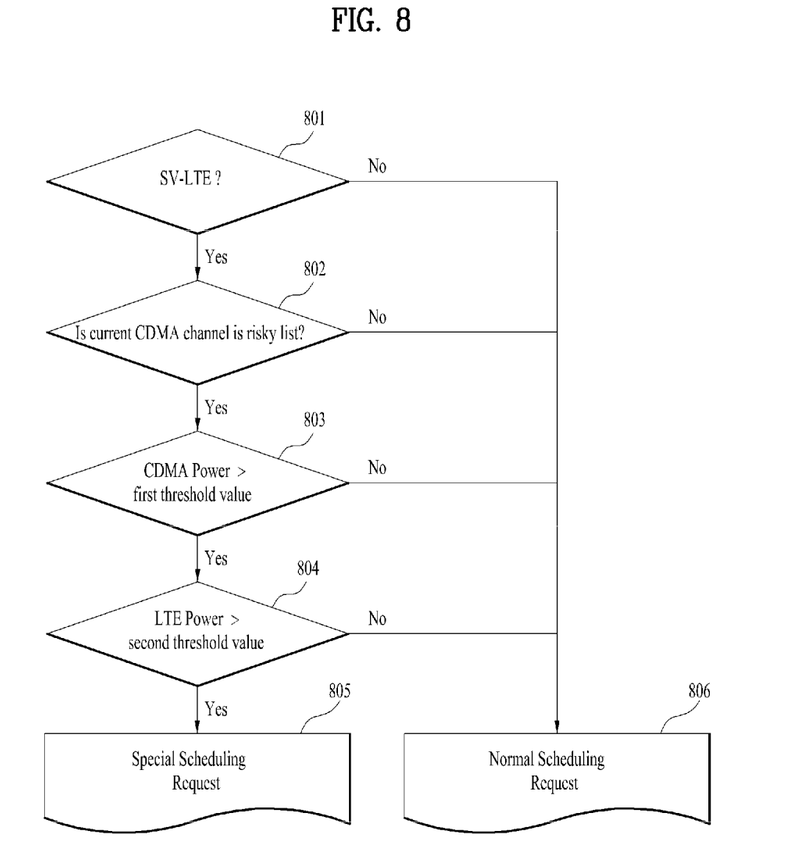
FIG. 8 is a flowchart for a method of transmitting an uplink signal from a user equipment according to an embodiment of the present invention.

FIG. 8 is a flowchart for a method of transmitting an uplink signal from a user equipment according to an embodiment of the present invention.

Referring to FIG. 8, a user equipment checks whether it operates in SVLTE by checking a current operating mode before transmitting a signal [S801]. Subsequently, the user equipment checks whether a current channel belongs to a dangerous channel range by checking a current CDMA channel information [S802].

The user equipment recognizes whether noise due to an inter-modulation product is generated by checking whether a transmission power of CDMA/LTE exceeds a threshold value [S803, S804]. Through this procedure, the user equipment determines whether a signal to be transmitted will affect reception performance and then sends a special message for avoiding the influence on the reception performance, i.e., a message 'special scheduling request' to a base station [S805].

Meanwhile, if the user equipment does not operate in SVLTE, the current CDMA channel does not belong to the dangerous channel range, or the transmission power of CDMA or LTE is equal to or smaller than the threshold value, the user equipment sends a normal message 'scheduling request' to the base station [S806].

Figure 9:
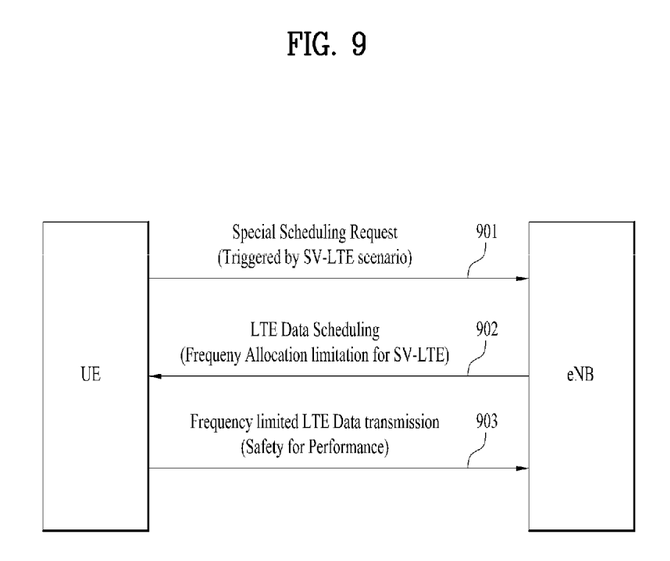
FIG. 9 is a flowchart for a method of transmitting an uplink signal from a user equipment according to a first embodiment of the present invention.

FIG. 9 is a flowchart for a method of transmitting an uplink signal from a user equipment according to a first embodiment of the present invention. In particular, FIG. 9 assumes a case that a user equipment sends a message 'special scheduling request' to a base station, as shown in FIG. 8.

Referring to FIG. 9, a user equipment (UE) sends a message 'special scheduling request' to a base station (eNB). Subsequently, the base station schedules the user equipment on a frequency band, in which an inter-modulation product is not generated in SVLTE, i.e., on a safe frequency band only [S902]. Finally, the user equipment receives a limited scheduling information and then transmits an uplink signal on the safe frequency band. The safe frequency band and the risky frequency band shall be described with reference to FIG. 10 as follows.

Figure 10:
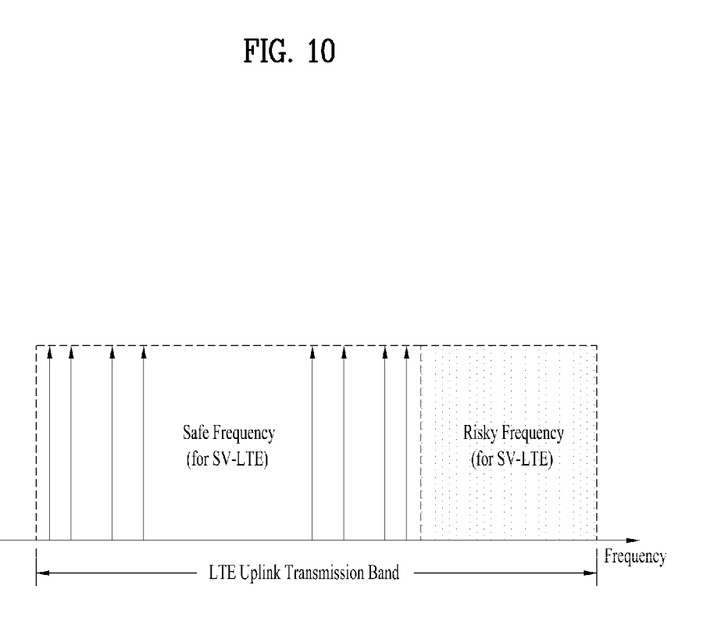
FIG. 10 is a diagram for an example of dividing an uplink band of LTE system into a safe frequency band and a risky frequency band in SVLTE according to an embodiment of the present invention.

FIG. 10 is a diagram for an example of dividing an uplink band of LTE system into a safe frequency band and a risky frequency band in SVLTE according to an embodiment of the present invention. In particular, when an uplink signal is transmitted, even if an inter-modulation product is generated, if a frequency band does not affect a downlink reception frequency band, the corresponding band is a safe frequency band. On the contrary, a frequency band, which affects a downlink reception frequency band due to the generation of the inter-modulation product, is a risky frequency band.

Meanwhile, physical channel used in uplink for LTE system include PRACH for a random access, PUCCH for control information transfer, and PUSCH for data transfer, a base station preferably puts limitation on a frequency used by the above manner for all physical channels including PRACH, PUCCH, PUSCH and the like.

Figure 11:
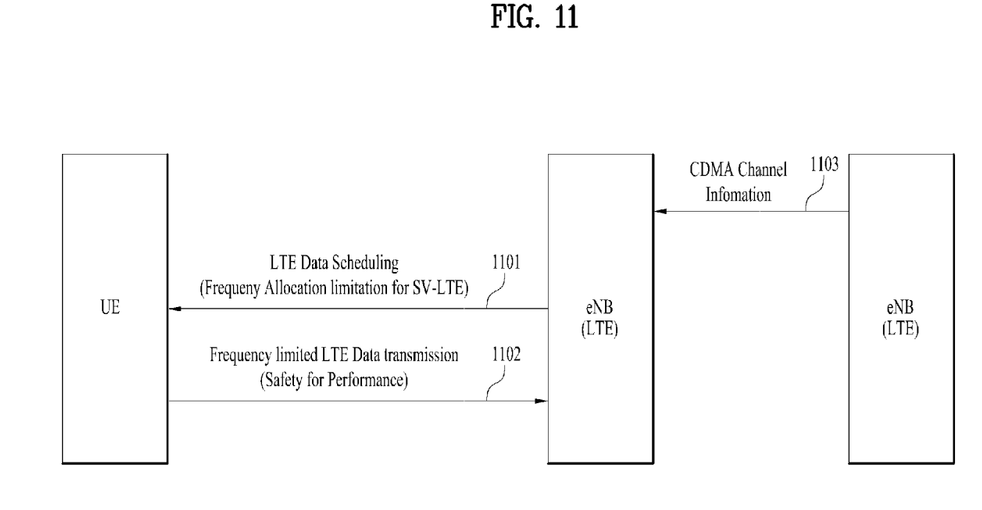
FIG. 11 is a diagram for a method of transmitting an uplink signal from a user equipment according to a second embodiment of the present invention.

FIG. 11 is a diagram for a method of transmitting an uplink signal from a user equipment according to a second embodiment of the present invention.

Referring to FIG. 11, a base station of LTE system, i.e., an eNB receives channel information from a neighbor base station of CDMA system and is then able to use the received channel information to put limitation on a transmission frequency of an LTE user equipment existing within a coverage [S1101].

If the eNB determines that a channel, which may trigger an inter-modulation product, is contained in the channel information received from the neighbor base station of the CDMA system, the eNB transmits a scheduling information for limiting the transmission frequency of the LTE user equipment to a safe frequency band only [S1102]. Having received the limited scheduling information, the user equipment transmits an uplink signal on the safe frequency band [S1103].

Figure 12:
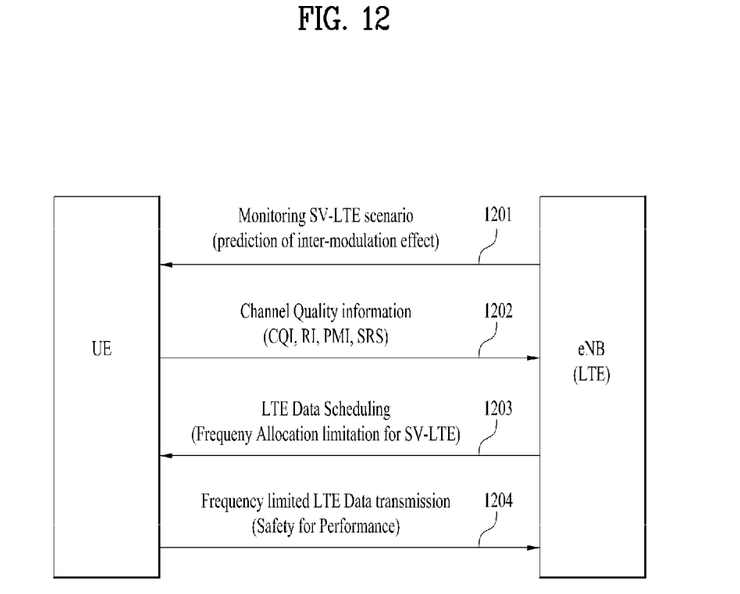
FIG. 12 is a diagram for a method of transmitting an uplink signal from a user equipment according to a third embodiment of the present invention.

FIG. 12 is a diagram for a method of transmitting an uplink signal from a user equipment according to a third embodiment of the present invention.

Referring to FIG. 12, a user equipment (UE) monitors a current SVLTE scenario [S1201]. In doing so, if a reception performance degradation according to an inter-modulation product in SVLTE mode is predicted, the user equipment reports an information of a corresponding frequency as a preset value in such a channel quality information transmitted to a base station (eNB) as CQI, RI, PMI, SRS and the like [S1201]. In this case, the preset value can be set to a value indicating that a quality of a channel on the risky frequency band is in a poor state.

Subsequently, the base station transmits a scheduling information for limiting a transmission frequency of the LTE user equipment to a safe frequency band only [S1203]. Having received the limited scheduling information, the user equipment transmits an uplink signal on the safe frequency band [S1204]. In particular, according to a third embodiment of the present invention, even if the base station does not put direct frequency limitation, the base station is able to perform scheduling by avoiding a corresponding frequency using the basic information provided by the user equipment.

Figure 13:
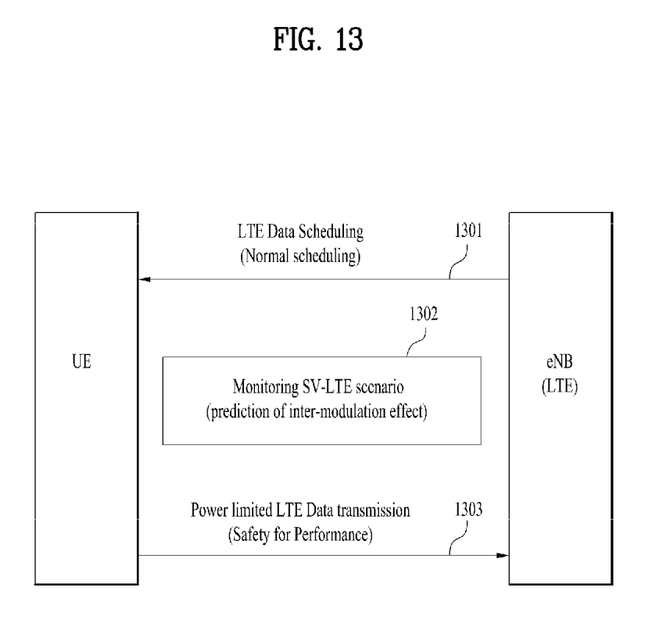
FIG. 13 is a diagram for a method of transmitting an uplink signal from a user equipment according to a fourth embodiment of the present invention.

FIG. 13 is a diagram for a method of transmitting an uplink signal from a user equipment according to a fourth embodiment of the present invention.

Referring to FIG. 13, a user equipment receives a normal scheduling information instead of requesting and receiving a separate 'special scheduling' [S1301]. Yet, the user equipment predicts an effect of an inter-modulation product in SVLTE mode by itself [S1302] and then puts limitation on a transmission power by itself [S1303]. Thus, it is able to consider this method for avoiding the performance degradation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A dual mode terminal comprising:
   a first communication module configured to transceive a PS (packet switching) service signal with a first base station;
   a second communication module configured to transceive a CS (circuit switching) service signal with a second base station;
   a first antenna configured to transceive a signal with either the first base station or the second base station; and
   a second antenna configured to receive signals from the first base station and the second base station,
   wherein if an uplink transmission mode is a mode for simultaneous transmission to the first base station and the second base station, the first communication module determines whether a transmission power to the first base station is equal to or greater than a threshold value,
   wherein if the transmission power to the first base station is equal to or greater than the threshold value, the first communication module transmits a simultaneous transmission mode dedicated scheduling request signal for excluding a risky frequency band from an uplink band to the first base station, and
   wherein the first communication module receives scheduling information on the uplink band other than the risky frequency band from the first base station in response to the simultaneous transmission mode dedicated scheduling request signal.

2. The dual mode terminal of claim 1, wherein the risky frequency band comprises a frequency band situated within a preset value from an uplink band to the second base station in the uplink band to the first base station.

3. The dual mode terminal of claim 2, wherein the uplink band to the first base station ranges from 777 MHz to 787 MHz and wherein the uplink band to the second base station ranges from 824 MHz to 849 MHz.

4. The dual mode terminal of claim 1, wherein an inter-modulation product between an uplink signal to the first base station through the risky frequency band and an uplink signal to the second base station is generated on at least a downlink band from the first base station or a downlink band from the second base station.

5. The dual mode terminal of claim 1, wherein the first base station comprises an LTE (long term evolution) base station and wherein the second base station comprises a CDMA (code divisional multiple access) base station.

6. A method of controlling a dual mode terminal in an MIMO (multiple-input and multiple-output) wireless communication system, the method comprising:
   if an uplink transmission mode is a mode for simultaneous transmission to an LTE (long term revolution) base station and a CDMA (code divisional multiple access) base station, determining whether a transmission power to the LTE base station is equal to or greater than a threshold value;
   if the transmission power to the LTE base station is equal to or greater than the threshold value, transmitting a simultaneous transmission mode dedicated scheduling request signal for excluding a risky frequency band from an uplink band to the LTE base station;
   receiving scheduling information on the uplink band other than the risky frequency band from the LTE base station in response to the simultaneous transmission mode dedicated scheduling request signal;
   transmitting a CS (circuit switching) service signal to the CDMA base station; and
   transmitting a PS (packet switching) service signal to the LTE base station using the scheduling information.

7. The method of claim 6, wherein the risky frequency band comprises a frequency band situated within a preset value from an uplink band to the CDMA base station in the uplink band to the LTE base station.

8. The method of claim 7, wherein an inter-modulation product between an uplink signal to the LTE base station through the risky frequency band and an uplink signal to the CDMA base station is generated on at least a downlink band from the LTE base station or a downlink band from the CDMA base station.

9. The method of claim 7, wherein the uplink band to the LTE base station ranges from 777 MHz to 787 MHz, and wherein the uplink band to the CDMA base station ranges from 824 MHz to 849 MHz.

10. The method of claim 6, wherein an inter-modulation product between an uplink signal to the LTE base station through the risky frequency band and an uplink signal to the CDMA base station is generated on at least a downlink band from the LTE base station or a downlink band from the CDMA base station.

* * * * *